United States Patent [19]

Park

[11] Patent Number: 5,796,826

[45] Date of Patent: Aug. 18, 1998

[54] APPARATUS FOR LIMITING REPRODUCIBLE NUMBER OF MAGNETIC RECORDING MEDIUM

[75] Inventor: Tae Joon Park, Seoul, Rep. of Korea

[73] Assignee: LG Electronics Inc., Seoul, Rep. of Korea

[21] Appl. No.: 565,998

[22] Filed: Dec. 1, 1995

[30] Foreign Application Priority Data

Jan. 16, 1995 [KR] Rep. of Korea ................... 1995-612

[51] Int. Cl.$^6$ ................................................ G11B 15/087
[52] U.S. Cl. ................................ 380/5; 380/21; 380/22
[58] Field of Search ......................... 380/5, 21, 22

[56] References Cited

U.S. PATENT DOCUMENTS 5,440,631   8/1995   Akiyama et al. .................... 380/4

Primary Examiner—Gilberto Barrón, Jr.
Attorney, Agent, or Firm—John P. White; Cooper & Dunham LLP

[57] ABSTRACT

A reproducible number limiting apparatus for a magnetic recording medium using a reproducible number limiting algorithm is disclosed including: scrambling means for scrambling an input bit stream using a scrambling key; encryption means for encrypting the scrambling key used in the scrambling means' scrambling and additional information, and outputting a ciphertext; a key storage for storing an encryption key required in encryption; recording/reproducing means for recording or reproducing the output of the scrambling means and encryption means; decryption means for updating the additional information for every playback from the ciphertext using an encryption key, and destroying the scrambling key when the additional information satisfies a specific condition; and descrambling means for descrambling a reproduced bit stream using the scrambling key from the decryption means.

19 Claims, 9 Drawing Sheets

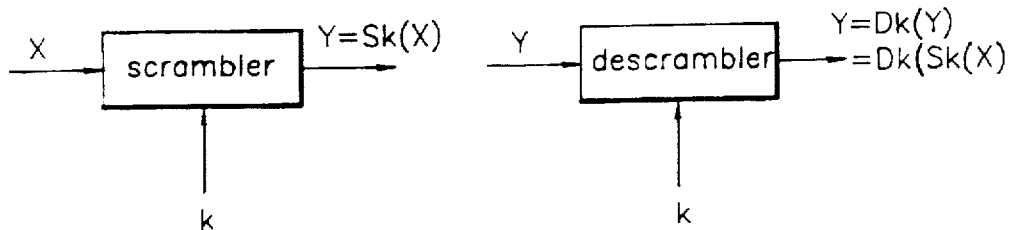
FIG.1A
prior art
FIG.1B
prior art
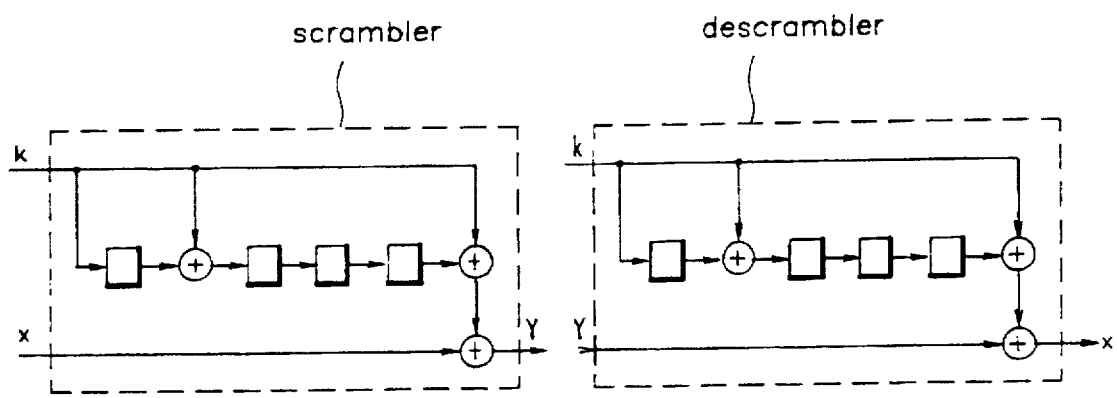
FIG.2
prior art
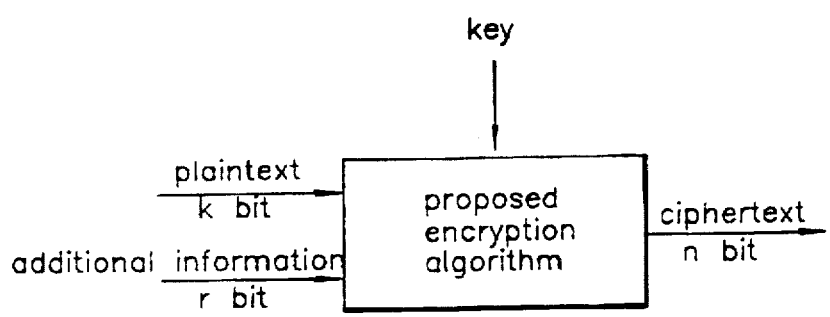
FIG.3

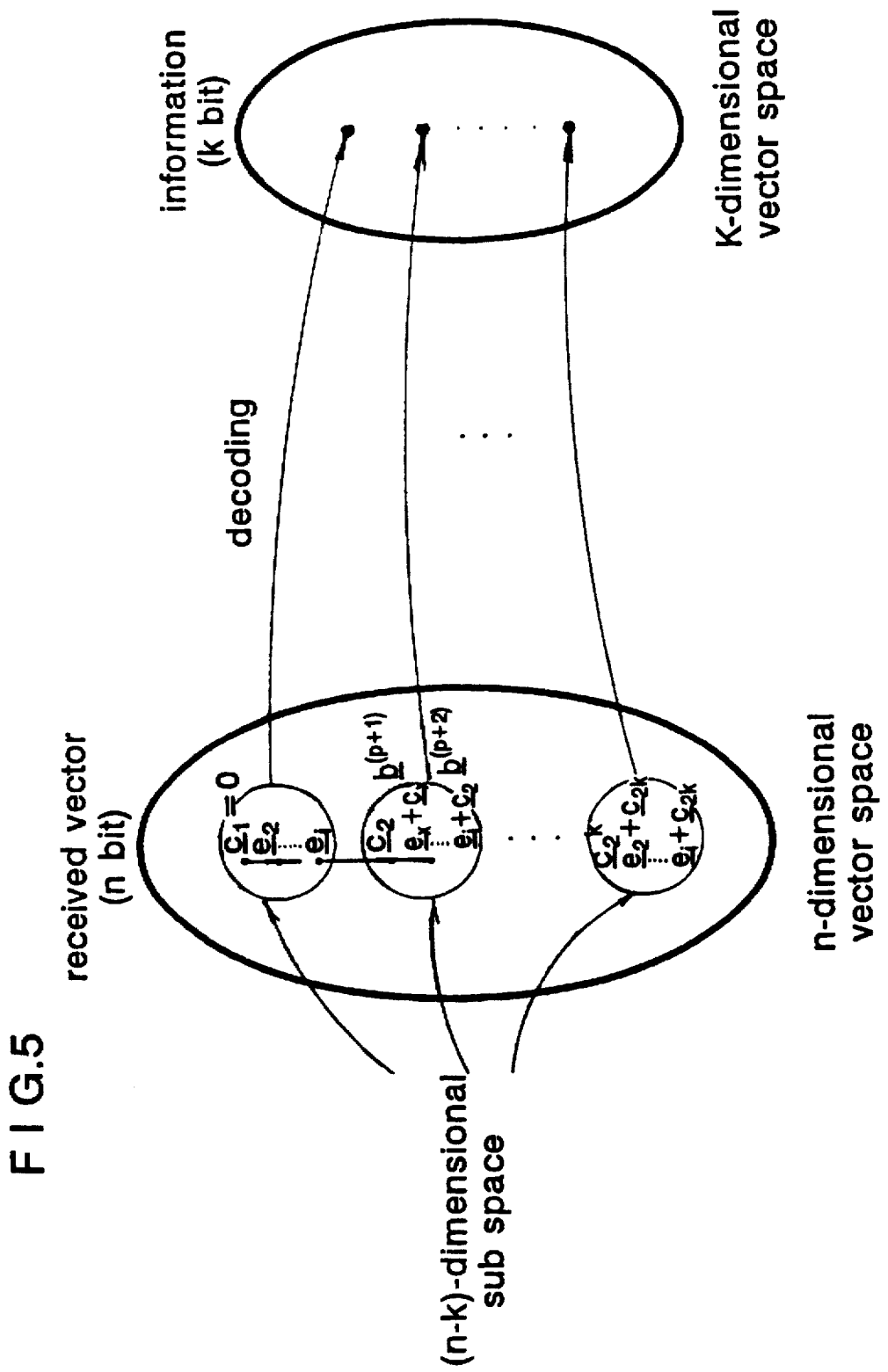
F I G. 5

FIG.6

| $\underline{c}_1 = \underline{0}$ | $\underline{c}_2$ | $\cdots$ | $\underline{c}_j$ | $\cdots$ | $\underline{c}_{2^k}$ |
|---|---|---|---|---|---|
| $\underline{e}_2$ | $\underline{e}_2 + \underline{c}_2$ | $\cdots$ | $\underline{e}_2 + \underline{c}_j$ | $\cdots$ | $\underline{e}_2 + \underline{c}_{2^k}$ |
| $\underline{e}_3$ | $\underline{e}_3 + \underline{c}_2$ | $\cdots$ | $\underline{e}_3 + \underline{c}_j$ | $\cdots$ | $\underline{e}_3 + \underline{c}_{2^k}$ |
| $\vdots$ | $\vdots$ | | $\vdots$ | | $\vdots$ |
| $\underline{e}_i$ | $\underline{e}_i + \underline{c}_2$ | $\cdots$ | $\underline{e}_i + \underline{c}_j$ | $\cdots$ | $\underline{e}_i + \underline{c}_{2^k}$ |
| $\vdots$ | $\vdots$ | | $\vdots$ | | $\vdots$ |
| $\underline{e}_{2^{n-k}}$ | $\underline{e}_{2^{n-k}} + \underline{c}_2$ | $\cdots$ | $\underline{e}_{2^{n-k}} + \underline{c}_j$ | $\cdots$ | $\underline{e}_{2^{n-k}} + \underline{c}_{2^k}$ |

F I G. 7
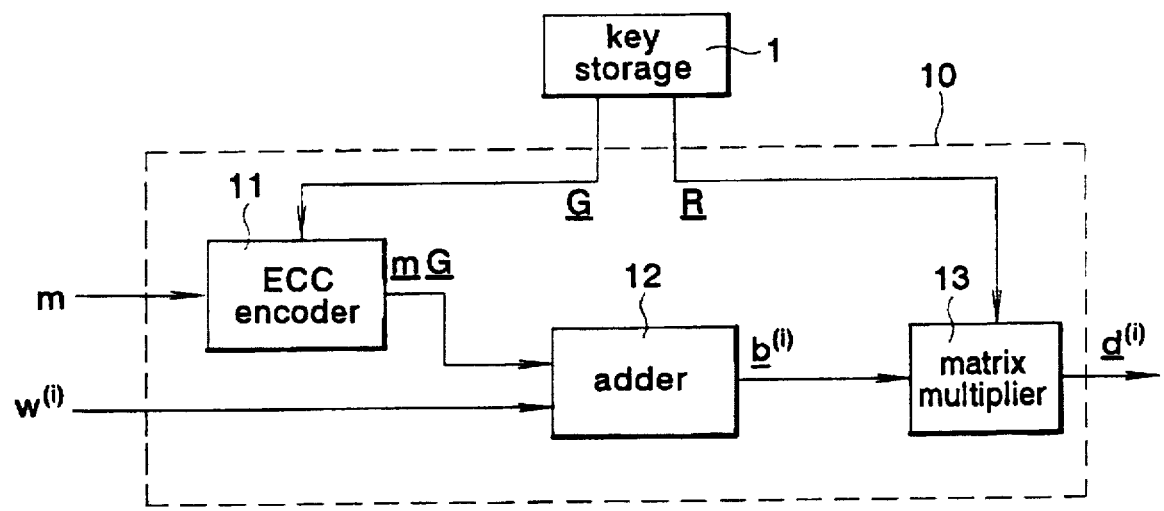
F I G. 8
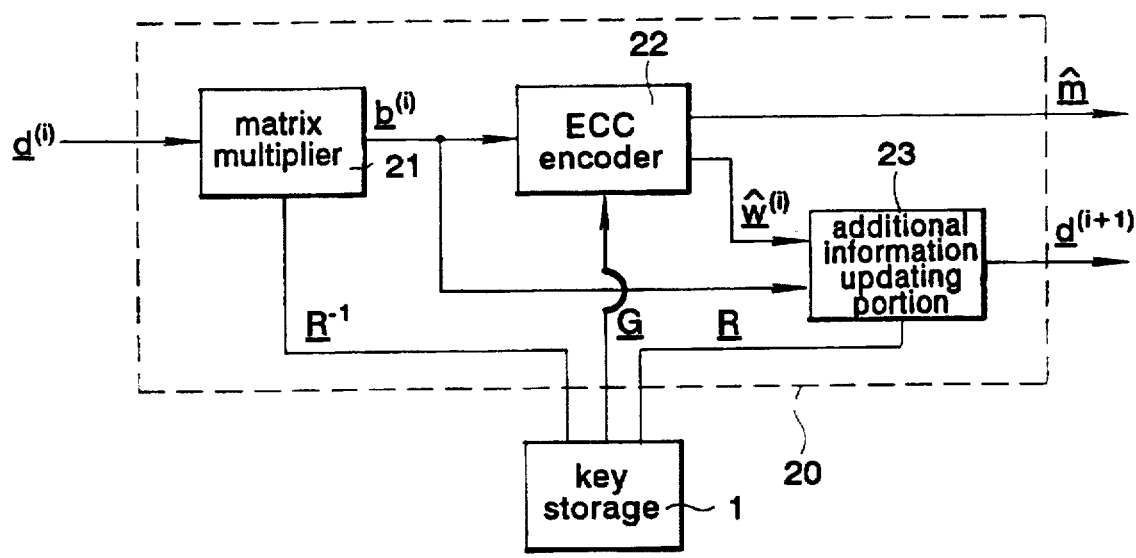

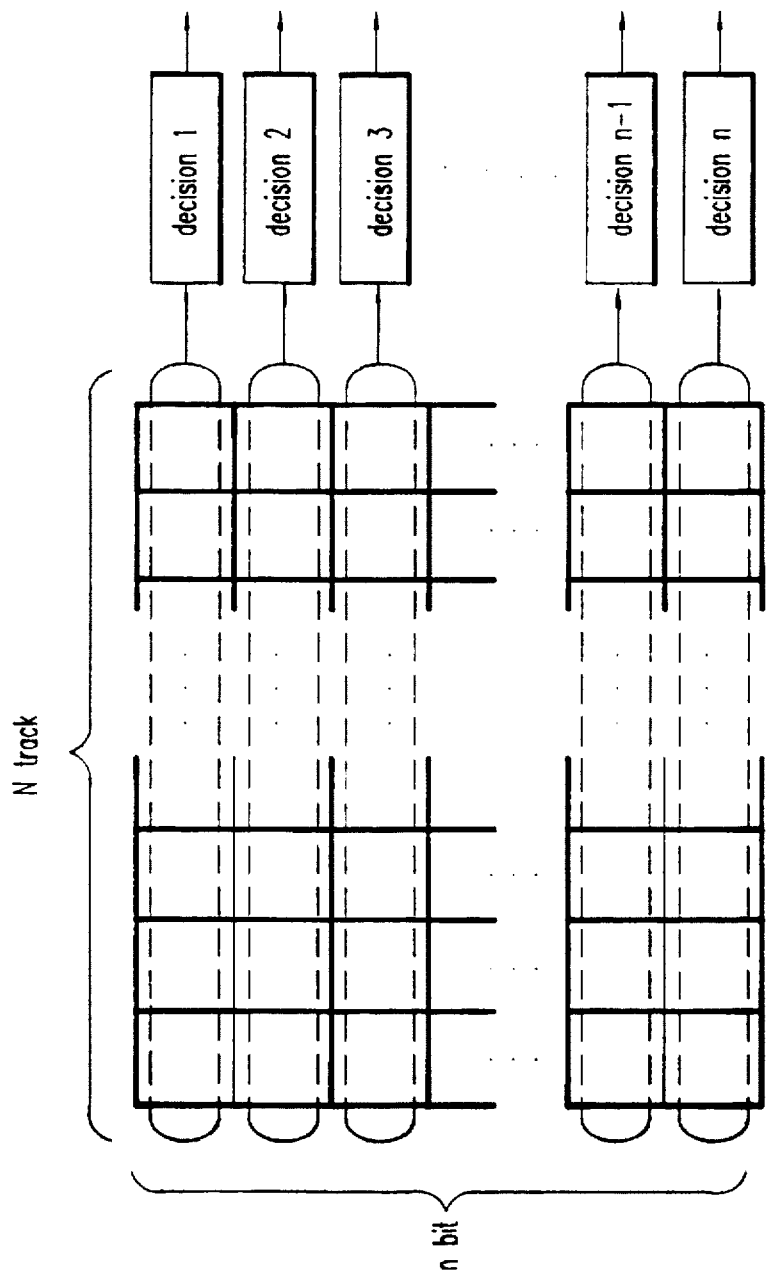
F I G. 12

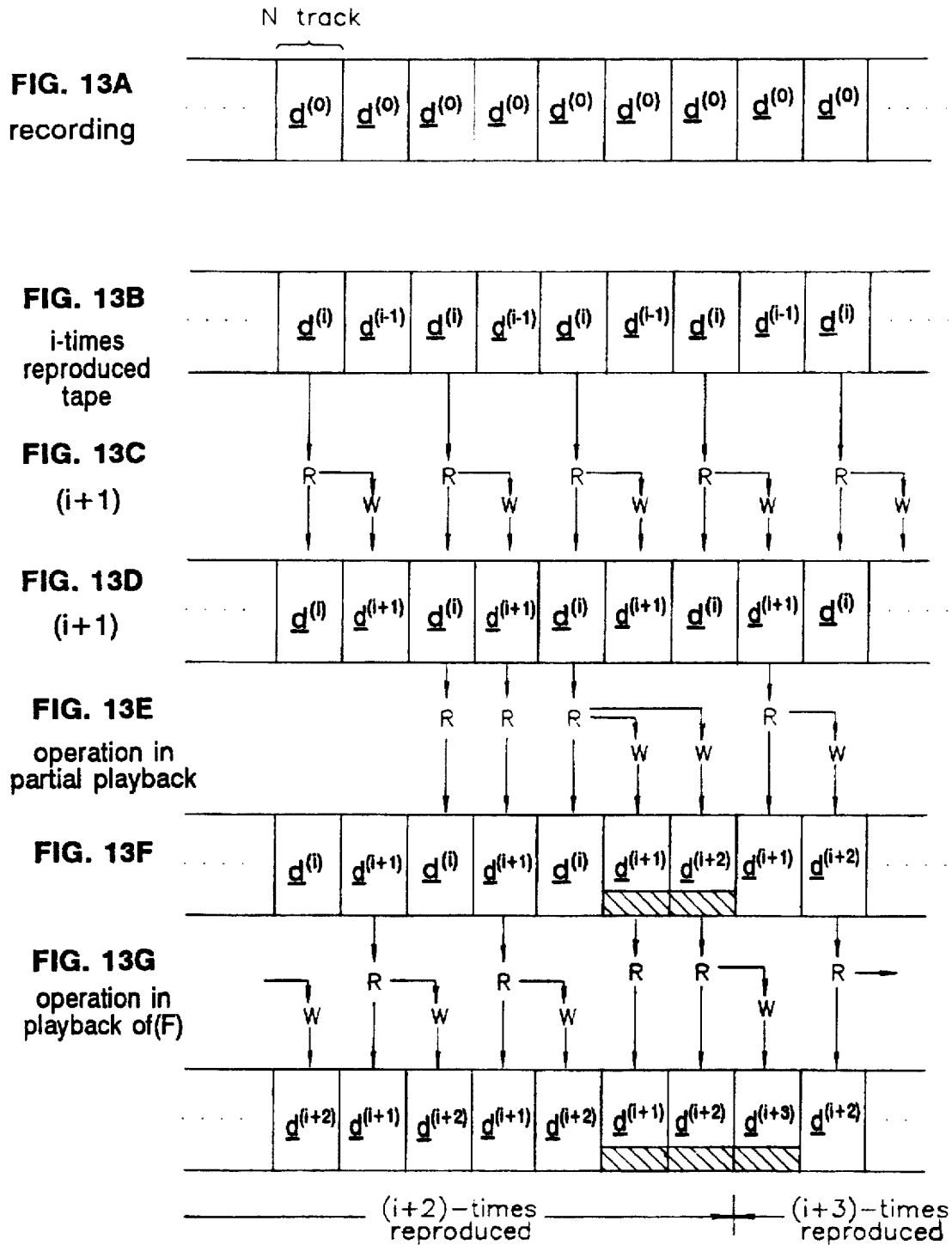

APPARATUS FOR LIMITING REPRODUCIBLE NUMBER OF MAGNETIC RECORDING MEDIUM

BACKGROUND OF THE INVENTION

The present invention relates to an apparatus for limiting the reproducible number of a magnetic recording medium, and more particularly, to an apparatus for limiting the reproducible number of a magnetic recording medium, in which video tape recorded by a digital video recorder (DVCR) is reproduced by a predetermined number.

With the advent of information age, there has become essential copyright protection against programs such as movies and music transmitted to users via a variety of media (for instance, magnetic recording medium). For instance, there is a copyright protection method in video-on-demand (VOD) service.

In order to protect digital data from being hacked, scrambling/descrambling using scrambler/descrambler is utilized widely. The VOD service includes asymmetric digital subscriber line (ADSL) mode using telephone line, and a mode using DVCR (see Broadcast and Technology Vol. 35, Screen Digest in May 1994, and so on). The method using DVCR was developed by $EMC^3$ Co., Ltd. in which a program of 100 hours is compressed into 5-minute program for transmission, and then sent to home. At home the received compressed signal is recorded by a DVCR and restored to be converted into analog. For copyright protection, $ENC^3$ Co., Ltd.'s method is made to automatically erase a program after twice playback.

Referring to FIG. 1A, a scrambler is an encryption system for converting plaintext x into ciphertext Y using key K. Referring to FIG. 1B, a descrambler is a system for converting ciphertext Y into a decrypted text X using key K. Here, the scrambler and descrambler require high-speed operation and use stream cipher which is an encryption method.

FIG. 2 shows an example of scrambler and descrambler using the stream cipher. In this example, key K is four bits. However, for security, the key is usually about 64 bits.

Meanwhile, in order to protect copyright on VOD service using DVCR, there was proposed by $ENC^3$ a method of automatically erasing a program after twice playback. This method, which is to protect the copyright of a program recorded on a digital storage medium (DSM), is very effective when used together with an appropriate copy protection method. However, the $EMC^3$ method is fixed to twice in the reproducible number, and low in security.

SUMMARY OF THE INVENTION

Therefore, it is an object of the present invention to provide a reproducible number limiting apparatus for a magnetic recording medium in which the reproducible number of a video tape can be controlled arbitrarily and by a program supplier.

To accomplish the object of the present invention, there is provided a reproducible number limiting apparatus for a magnetic recording medium using a reproducible number limiting algorithm including: scrambling means for scrambling an input bit stream using a scrambling key; encryption means for encrypting the scrambling key used in the scrambling means' scrambling and additional information, and outputting a ciphertext; a key storage for storing an encryption key required in encryption; recording/reproducing means for recording or reproducing the output of the scrambling means and encryption means; decryption means for updating the additional information for every playback from the ciphertext using an encryption key, and destroying the scrambling key when the additional information satisfies a specific condition; and descrambling means for descrambling a reproduced bit stream using the scrambling key from the decryption means.

BRIEF DESCRIPTION OF THE ATTACHED DRAWINGS

FIGS. 1A and 1B are block diagrams of general scrambler and descramblers

FIG. 2 shows a configuration of a scrambler and descrambler using a general stream cipher method;

FIG. 3 illustrates the summary of an encryption algorithm of the present invention;

FIG. 5 is a diagram of the vector space for a general error correction code;

FIG. 6 shows a standard array for linear codes n and k;

FIG. 7 illustrates a hardware configuration for the encryption algorithm of the present invention;

FIG. 8 illustrates a hardware configuration for the decryption algorithm of the present invention;

FIG. 12 shows a repetition code error correction process of the present invention;

FIGS. 13A–13D show an updating process of a ciphertext of the present invention.

FIGS. 13E–13G show a partial updating process of a ciphertext of the present invention.

DETAILED DESCRIPTION OF THE INVENTION

Figure 4:
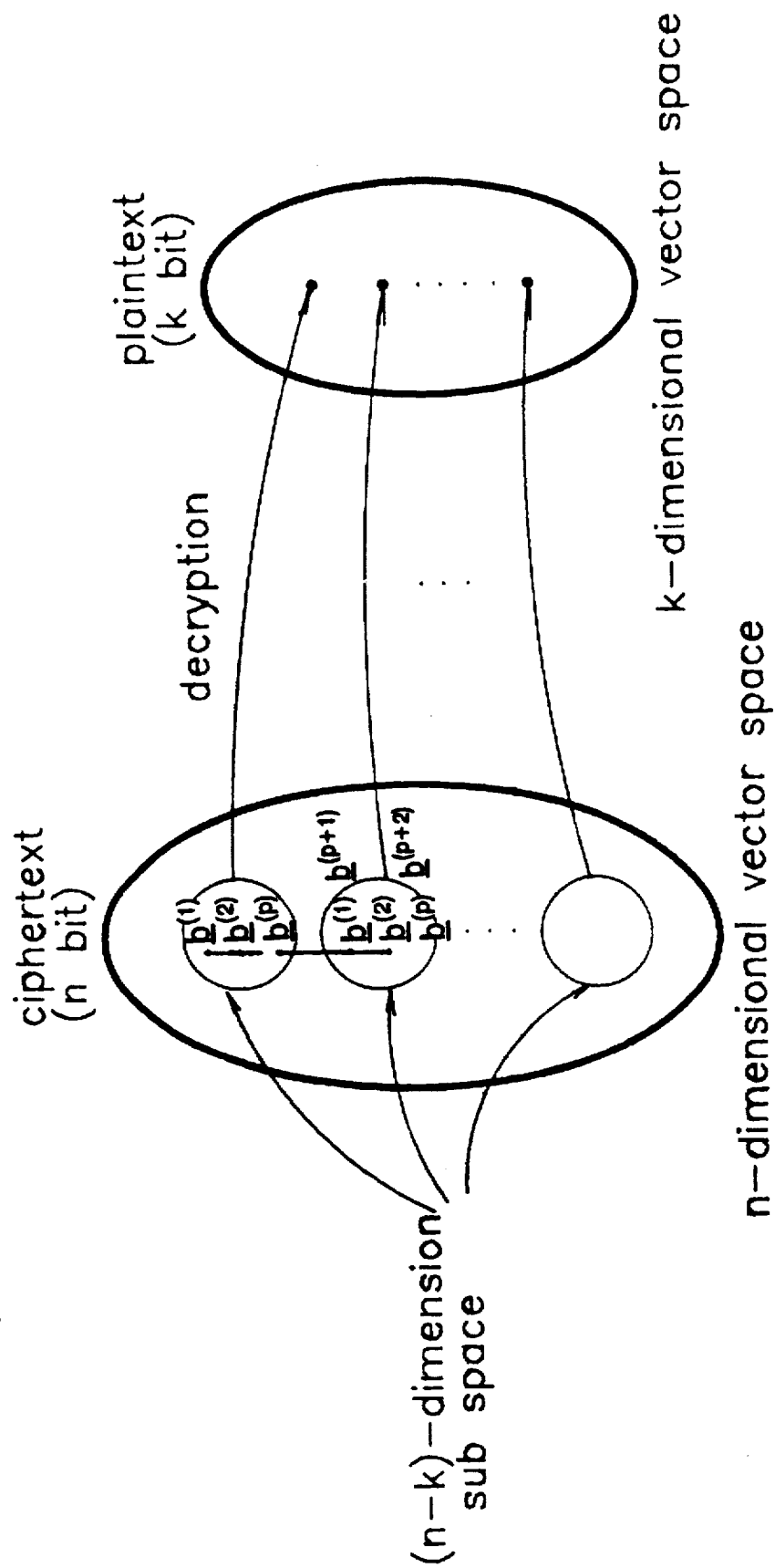
FIG. 4 is a diagram of the vector space for the encryption algorithm of the present invention.

Hereinafter, a preferred embodiment of the present invention will be described below with reference to the attached drawings.

For the concept of the present invention, an input bit stream is scrambled and recorded on video tape, and a scrambling key used in scrambling is encrypted using an encryption algorithm proposed in the present invention, together with additional information indicative of a reproducible number remaining, and then recorded on video tape.

In playback of video tape, a decryption algorithm corresponding to the encryption algorithm is used to restore a scrambling key and information on a reproducible number remaining. Using the restored scrambling key, the original bit stream is restored through descrambling. Here, the reproducible number remaining is reduced by one and then recorded on video tape.

If the reproducible number remaining is 0, a mechanism for automatically destroying the scrambling key information is given so that the scrambling key is not restored in further playback to thus disable normal display. An encryption algorithm required in implementing the reproducible number limiting method for video tape must have the following functions.

1) encrypting additional information as well as a plaintext;

2) updating the additional information from a ciphertext, and automatically destroying the plaintext if the additional information satisfies a specific condition; and 3) the security level of an encryption algorithm must be high (higher than data encryption standard (DES) algorithm, the US encryption standard).

An encryption algorithm proposed in the present invention will be described below.

First, this proposed encryption algorithm can be expressed as shown in FIG. 3. Its input signals are k-bit plaintext, additional information and encryption key. Its output signal is n-bit encrypted ciphertext. The algorithm of the present invention will be explained using the following symbols.

$m = [m_0, m_1, \ldots, m_{k-1}]$: (1×k) vector, scrambling key $w^{(i)} = [w_0^{(i)}, w_1^{(i)}, \ldots, w_{n-1}^{(i)}]$: (1×n) vector, additional information $b^{(i)} = [b_0^{(i)}, b_1^{(i)}, \ldots, b_{n-1}^{(i)}]$: (1×n) vector $d^{(i)} = [d_0^{(i)}, d_1^{(i)}, \ldots, d_{n-1}^{(i)}]$: (1×n) vector, encrypted scrambling key $\hat{m}, \hat{w}^{(i)}$: an estimated value by ECC decoding G: (k×n) matrix, and generator matrix of linear codes n and k R: (n×n) nonsingular, binary, and weight randomization matrix $$R = \begin{vmatrix} r_{11} & r_{12} & \cdots & r_{1n} \\ r_{21} & r_{22} & \cdots & r_{2n} \\ \cdot & \cdot & & \cdot \\ \cdot & \cdot & & \cdot \\ \cdot & \cdot & & \cdot \\ r_{n1} & r_{n2} & \cdots & r_{nn} \end{vmatrix}, \; r_{ij} \in GF(2), i,j = 1, 2, \ldots, n$$

$R^{-1}$: (n×n), the inverse matrix of the Weight randomization matrix;

t: error correction capability;

p: reproducible number; and weight(w): hamming weight of vector w.

Meanwhile, the reproducible number limiting method is implemented as the following concept.

First, the scrambling key is encrypted as a plaintext, and the ciphertext is converted into a different value for every playback. Here, this conversion can precisely restore the scrambling key from the converted ciphertext until pth conversion. However, it is impossible to restore the scrambling key from the converted ciphertext according to the further conversion. In other words, the scrambling key is destroyed automatically.

The above-explained concept can be visualized using the vector space shown in FIG. 4. Specifically, conversion until pth is performed within the same subspace. The subspace is transited by the (p+1)th conversion.

In decryption, elements of the same subspace are mapped as the same plaintext. Therefore, the scrambling key is restored until pth but cannot be restored from (p+1)th.

In order to make such concept as an algorithm, the present invention uses error correction code (ECC). FIG. 5 shows the standard array of linear codes n and k of FIG. 6 on a vector space. FIG. 5 has the same structure as FIG. 4.

A conversion regulation in which the conversion of a ciphertext satisfies the conditions of FIG. 4 can be defined using error correction capability t of ECC. In FIG. 5, the elements of the same subspace (jth subspace) are $c_j$, and $e_i + c_j$, $i = 1, 2, \ldots, 2^{n-k}$. The hamming weight of $e_i$ is smaller than or equal to value t.

In other words, weight$(e_i) \leq t$, $i = 1, 2, \ldots, 2^{n-k}$

If a vector in which the hamming weight is greater than t is added to $c_j$, it is transited to a different subspace so that the original information cannot be restored by decoding.

In order to use such a characteristic of ECC, the scrambling key is encoded using generator matrix G with information vector m. Vector $w^{(i)}$ indicative of additional information is added to the encoded data to produce vector $b^{(i)}$.

$$b^{(i)} = m \cdot G + w^{(i)} \qquad \text{equation (1)}$$

Here, weight$(w^{(i)}) = i$. It is determined according to the hamming weight of vector $w^{(i)}$ whether scrambling key m can be restored or not.

From equation (1), if generator matrix G is known, information vector and additional information vector are easily exposed by decoding. Because the hamming weight of $w^{(i)}$ is given as i, it may be easily changed by operating only several bits of vector $b^{(i)}$.

In other words, the automatic destroying function can be invalidated by operating the hamming weight without knowing G.

$$d^{(i)} = b^{(i)} \cdot R \qquad \text{equation (2)}$$

where weight$(w^{(i)} R)$ is random.

R is a matrix which makes weight$(w^{(i)} R)$ random regardless of i, and must be a nonsingular (determinant is nonzero) matrix since it requires $R^{-1}$ in decoding.

The following encryption algorithm is obtained by combining equations (1) and (2).

$$b^{(i)} = m \cdot G + w^{(i)}$$

$$d^{(i)} = b^{(i)} \cdot R$$

where weight$(w^{(i)}) = i$, and weight$(w^{(i)} R)$ is random.

As shown in FIG. 7, the encryption algorithm is implemented by a key storage 1, ECC encoder 11, adder 12, and matrix multiplier 13. In FIG. 7, encryption keys R and G are stored in key storage 1. ECC encoder 11 uses an ECC encoding algorithm.

Adder 12 performs EXCLUSIVE-OR-operation of n-bit vector mG and $w^{(i)}$ in units of bits. Matrix multiplier 13 EXCLUSIVE-OR operates according to the following equation because all the elements are binary data as the multiplication of (1×n) vector $b^{(i)}$ by (n×n) matrix R.

A decryption algorithm is implemented reversely from the encryption algorithm. The decryption algorithm is as follows.

(1) $b^{(i)} = d^{(i)} \cdot R^{-1}$ (2) $\hat{m}, \hat{w}^{(i)}$ is obtained from ECC decoding.

If weight$(w^{(i)}) \leq t$, $\hat{m}^{(i)} = \hat{m}_w^{(i)} = m$

In other cases, $\hat{m}_{(i)} \neq \hat{m}_{w(i)}$ $$\underline{b}^{(i)} \cdot R = [b_0^{(i)}, b_1^{(i)}, \ldots, b_{n-1}^{(i)}] \cdot \begin{vmatrix} r_1 \\ r_2 \\ \cdot \\ \cdot \\ \cdot \\ r_n \end{vmatrix}$$

$$= \sum_{j=1}^{n} b_j^{(i)} r_j$$

$$= \sum_{b_j^{(i)} \neq 0} r_j$$

(3) $d^{(i+1)} = [b^{(i)} + \hat{w}^{(i)} + w^{(i+1)}] \cdot R$

Here, weight $(\hat{w}^{(i+1)})$ = weight $(\hat{w}^{(i)}) + 1$

The decryption algorithm must perform two functions, that is, restoration of plaintext and updating of additional information. For this, the algorithm has two portions of obtaining m and $w^{(i)}$ and updating $w^{(i)}$. This is formed by key storage 1, matrix multiplier 21, ECC decoder 22 and additional information updating portion 23, as shown in FIG. 8. $b^{(i)}$ is obtained from scrambling key vector $d^{(i)}$ encrypted in matrix multiplier 21. $\hat{m}$ and $\hat{w}^{(i)}$ extracted from $b^{(i)}$ through ECC decoder 22.

ECC decoder 22 uses a conventional ECC decoding algorithm. Restored $\hat{m}$ is used to descramble the bit streams in the descrambler. $\hat{w}^{(i)}$ is used to update $d^{(i)}$ to $d^{(i+1)}$ in additional information updating portion 23.

Updated ciphertext $d^{(i+1)}$ is recorded back on video tape. Here, if extracted weight($w^{(i)}$)≤t, $\hat{m}$=m, and the scrambling key is restored appropriately. In other cases, $\hat{m} \neq m$, and thus the scrambling key is destroyed.

Meanwhile, the algorithm proposed in the present invention is a secret-key encryption algorithm. Its stability is secured by an encryption key. The encryption key is matrix G and R. The number of available cases of the encryption key is as follows.

First, in linear codes n and k when error correction capability is t, G is present as many as $2^t/t$.

n×n binary matrix is present as many as $2^{n^2}$. Out of them, the probability of nonsingular cases is 0.5 so that the number of R available is $2^{n^2-1}$. Therefore, the encryption key is present as many as $2^t \cdot 2^{n^2-1}/t$.

In case that all the encryption keys available are tested as hacking, $2^t \cdot 2^{n^2-1}/t$ trials are required at maximum. This is very stable as compared with a case that the DES key widely used as the encryption algorithm is 64 bits and requires $2^{64}$ trials.

The DES key is fixed in length and uncontrollable in stability level. However, the proposed algorithm enables its stability level to be controlled according to the selection of n or k. The proposed algorithm also encrypts the additional information, and can update the additional information from the ciphertext. In addition, if the additional information satisfies a specific condition, the plaintext is automatically destroyed. Otherwise, to support those functions, an encryption key of $n^2 + nk$ bits is required.

(1) in recording of video tape i=t–p
$b^{(i)} = m \cdot G + w^{(i)}$
$d^{(i)} = b^{(i)} \cdot R$ (2) in playback of video tape 1) 1≤t
$b^{(i)} = d^{(i)} \cdot R^{-1}$
m and $w^{(i)}$ are obtained by ECC decoding.
$d^{(i+1)} = \{b^{(i)} + w^{(i)} + w^{(i+1)}\} \cdot R$ weight($w^{(i+1)}$) = weight($w^{(i)}$ + 1)

2) l=t+1
$b^{(t+1)} = d^{(t+1)} \cdot R^{-1}$
$\hat{m}$, $\hat{w}^{(t+1)}$ are obtained from ECC decoding.
$\hat{m} \neq m, \hat{w}^{(t+1)} \neq w^{(t+1)}$
$d^{(t+1)} = [b^{(t+1)} + \hat{w}^{(t+1)} w^{(t+2)}] \cdot R$
Here, weight($\hat{w}^{(t+2)}$) = weight($\hat{w}^{(t+1)}$ + 1

3) l>t+2
$b^{(i)} = d^{(i)} \cdot R^{-1}$
$\hat{m}$, $\hat{w}^{(i)}$ are obtained from ECC decoding.
$\hat{m} \neq m, \hat{w}^{(i)} \neq w^{(i)}$
$d^{(t+1)} = [b^{(t+1)} + \hat{w}^{(i)} + w^{(i+1)}] \cdot R$
Here, weight($\hat{w}^{(i+1)}$) = weight($\hat{w}^{(i)}$) + 1

In the above description, the encryption algorithm is used in the recording of video tape. The decryption algorithm is applied for every playback. Hereinbefore, the decryption in accordance with the number of playback has been discussed in detail.

Figure 9:
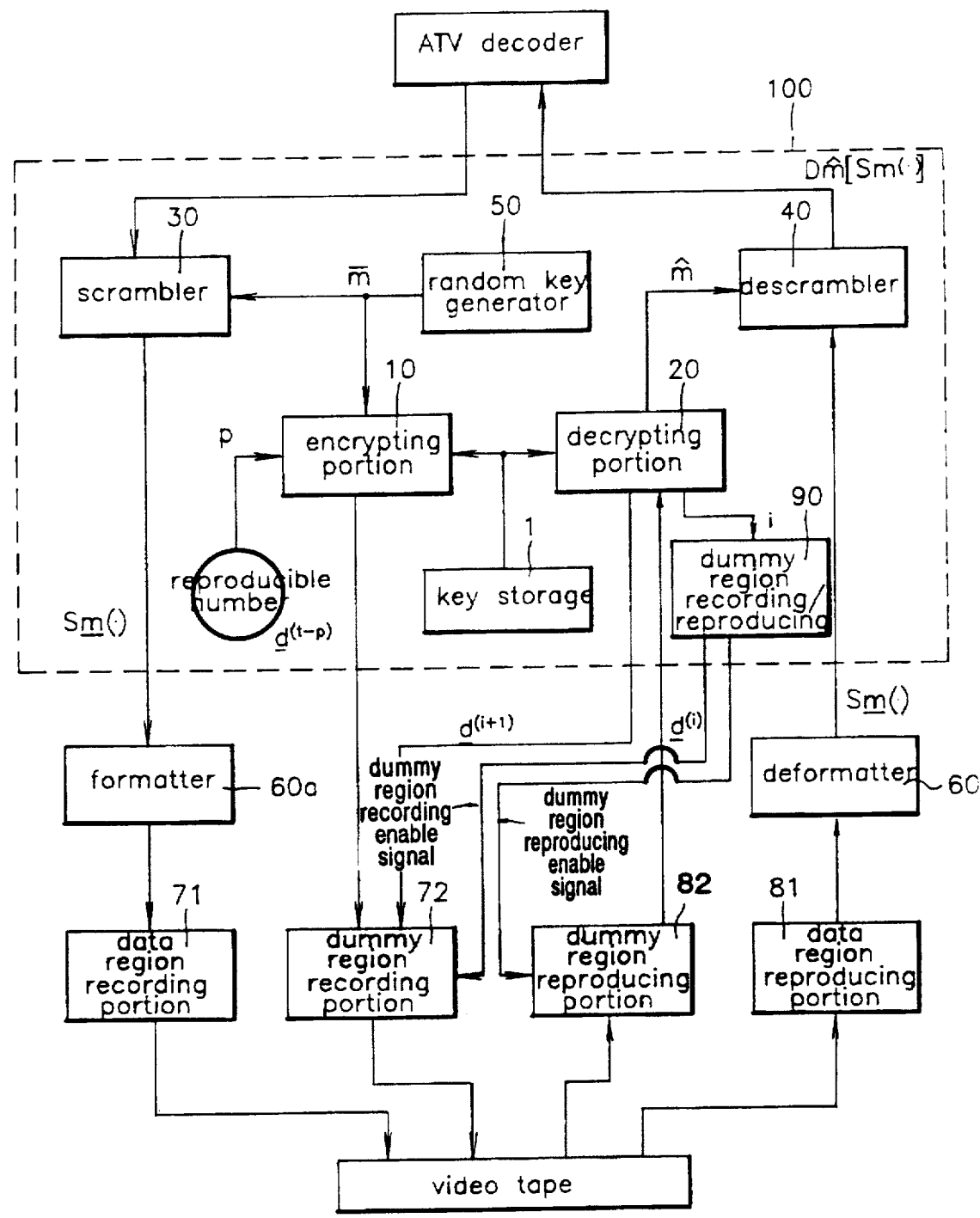
FIG. 9 is a block diagram of a reproducible number limiting apparatus for a magnetic recording medium of the present invention.

Meanwhile, using the reproducible number limiting algorithm of video tape, the reproducible number limiting apparatus for video tape of the present invention, as shown in FIG. 9, comprises a random key generator 50 for randomly producing a scrambling key, a scrambler 30 for scrambling the input bit stream using the scrambling key from random key generator 50, an encrypting portion 10 for encrypting the scrambling key and reproducible number used for scrambler 30's scrambling, and outputting a ciphertext, a key storage 1 for storing an encryption key required in encrypting portion 10's encryption, a formatter 60a for processing the output data of scrambler 30, a data region recording portion 71 for recording the output data of formatter 60a on video tape, a data region reproducing portion 81 for reproducing the data recorded on video tape, a deformatter 60b for processing the output of data region reproducing portion 81, a dummy region reproducing portion 82 for reproducing the ciphertext recorded on video tape, a decrypting portion 20 for decrypting the ciphertext reproducing signal of dummy region reproducing portion 82 using the encryption key from key storage 1 to obtain information on the scrambling key and reproducible number, and if the reproducible number is zero, disabling the scrambling key decryption, a descrambler 40 for descrambling the reproduced bit stream using the scrambling key decrypted from decrypting portion 20, a dummy region recording portion 72 for recording the output of encrypting portion 10 and the output of decrypting portion 20, and a dummy region recording/reproducing controller 90 for receiving the reproducible number from decrypting portion 20 and controlling the operation of dummy region recording portion 72 and dummy region reproducing portion 82.

Data is protected in two levels, that is, a scrambling level using scrambler and descrambler 30 and 40, and an encryption level using the encryption means of FIG. 7 and the decryption means of FIG. 8.

Specifically, the input bit stream is scrambled in scrambler 30, and the scrambling key used in scrambling is encrypted. Here, the scrambling key uses the output of random key generator 50, and is thus not stored. In order to find out the scrambling key, the encrypted scrambling key must be decrypted, ensuring high security.

In encrypting portion 10, the additional information containing the reproducible number is encrypted together with the scrambling key. In Decrypting portion 20, the additional information is updated for every playback. In case the additional information satisfies a predetermined condition, the scrambling key is supposed to be destroyed.

Meanwhile, formatter 60a processes the output of scrambler 30 in order to record the data on data region recording portion. The ciphertext output of encrypting portion 10 and the updated ciphertext output of decrypting portion 20 are recorded on video tape by dummy region recording portion 72 under the control of dummy region recording/reproducing controller 90.

The data recorded on video tape is reproduced through data region reproducing portion 81, and input to descrambler 40 through deformatter 60b. The ciphertext reproduced from dummy region reproducing portion 82 is input and decrypted in decrypting portion 20. It is improper that ciphertext $d^{(i)}$ encrypted in encrypting portion 10 is recorded on the data region along with the scrambled input bit stream. This is because the recording format of DVCR must be fully corrected in order to record $d^{(i)}$ on the data region.

In order to update $d^{(i)}$ in playback of video tape, the DVCR mode must be changed to recording mode from playback mode. In this case, precise control of recording position is hard. In addition, the recording tracks of video tape are superposed so that signal-to-noise (SNR) of nearby tracks is severely attenuated in updating $d^{(i)}$ to increase errors to the scrambled input bit stream.

Accordingly, only $d^{(i)}$ must be recorded on the dummy region of FIG. 10 so that interference between tracks due to the updating of $d^{(i)}$ does not affect the scrambled input bit stream.

In case of using the dummy region, a predetermined position and area of a track is ensured for $d^{(i)}$. This facilitates implementation in hardware. In addition, the reproducible number information is inserted into every track, ensuring the reproducible number information to be detected.

The data recorded on the dummy region is not error-corrected so that errors of $10^{-3}$ are produced in $d^{(i)}$. In case of updating and recording $d^{(i)}$, the SNR of nearby tracks is decreased greatly.

As shown in FIG. 10, such problems can be solved by using a repetition code for repetively recording $d^{(i)}$ on a predetermined place of the dummy region N times, and deciding in units of bits from N-track data in the detection of $d^{(i)}$.

Figure 11:
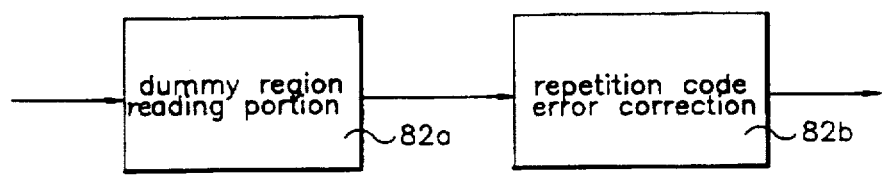
FIG. 11 shows a detailed configuration of the dummy area reproducing portion of the present invention.

In case of employing the repetition code, dummy region reproducing portion 82 is constructed to have dummy region reading portion 82a and repetition code error correction portion 82b, as shown in FIG. 11.

According to the error correction process using the repetition code, as shown in FIG. 12, the same $d^{(i)}$ is recorded on N tracks. In order to correct errors produced in playback, the following algorithm is decided in units of bits.

Out of N bits, the number of 1>the number of 0, decision 1 the number of 1<0 the number of 0, decision 0

The error probability of this method is deduced in (A1). In case that N is 5, and the error probability of a magnetic channel is $10^{-3}$, the error probability of the repetition code is $10^{-12}$ which indicates nearly error-free good performance.

(A1) error probability of repetition code

Given that the bit error probability is $\rho$ and the repetition number is N, the error probability of the repetition code $P_e(\rho,N)$ is deduced as follows.

$P_e(\rho,N)$=Pr (error is produced in a received symbol, 1 transmission)+Pr (error is produced in the received symbol, 0 transmission).

$$= \sum_{i=0}^{\frac{N-1}{2}} Pr(i1 \text{ and } (n-i) 0|1 \text{ transmission}) Pr(1 \text{ transmission}) +$$

$$\sum_{i=0}^{\frac{N-1}{2}} Pr(i0 \text{ and } (N-i) 1|0 \text{ transmission}) Pr(0 \text{ transmission})$$

$$= \frac{1}{2} \sum_{i=0}^{\frac{N-1}{2}} \begin{bmatrix} N \\ i \end{bmatrix} (1-\rho)^i \rho^{N-i} + \frac{1}{2} \sum_{i=0}^{\frac{N-1}{2}} \begin{bmatrix} N \\ i \end{bmatrix} (1-\rho)^i \rho^{N-i}$$

$$= \sum_{i=0}^{\frac{N-1}{2}} \begin{bmatrix} N \\ i \end{bmatrix} (1-\rho)^i \rho^{N-i}$$

Here, | indicates a conditional probability. This method is effective to burst error as well as random errors. The burst error is produced in units of tracks, and decision is performed from the values of N tracks. Therefore, the burst error is seen as random error in the decision means. This method also has a shuffling effect.

Meanwhile, the process of updating ciphertext $d^{(i)}$ on a track is shown in FIG. 13. In this drawing, the reproducible number p in recording of video tape is t (i=0). In this case, the repetition code is used so that the values of N tracks become one repetition code symbol. In FIG. 13, R indicates reproduction in dummy region reproducing portion 82. W indicates the recording in dummy region recording portion 72. The hatched portion is a marker to read a next repetition code symbol.

For the features of video tape, video tape always travels so that it cannot be possible to update once read $d^{(i)}$ and then record it at the very position. Otherwise, $d^{(i)}$ must be read from one repetition code symbol and then updated $d^{(i+1)}$ be recorded on a next repetition code symbol. Therefore, the minimum unit of updating is two repetition code symbols.

The repetition code symbol of i-times reproduced video tape of FIG. 13B has two states of $d^{(i-1)}$ and $d^{(i)}$. The operation of (i+1)-times playback is that $d^{(i)}$ is read as shown in FIG. 13C and $d^{(i+1)}$ updated from $d^{(i)}$ is then recorded on a position $d^{(i-1)}$ is recorded. As a result, the repetition code symbol of (i+1)-times reproduced video tape is in two states of $d^{(i)}$ and $d^{(i+1)}$, as shown in FIG. 13D.

In case of partial playback in which only part of video tape is reproduced, $d^{(i)}$ must be updated only on the reproduced part. The operation of this case will be shown in FIGS. 13E, 13F and 13G.

In FIG. 13E, when playback is performed from the middle of video tape, about three repetition code symbols are read to decide that $d^{(i+1)}$ must be updated to $d^{(i+2)}$. Then, $d^{(i+1)}$ is updated and recorded on next repetition code symbols along with the marker to read them. The marker is necessary in order to normally perform next playback.

As explained above, updating of ciphertext $d^{(i)}$ must be performed along with the playback of dummy region reproducing portion 82 and the recording of dummy region recording portion 72. Therefore, an appropriate control for recording or playback of one repetition code symbol is required. Dummy region recording/playback controller 90 controls the recording or playback of the repetition code symbol of the current track from the reproducible number of about three previous repetition code symbols As described above, the present invention allows a program supplier to arbitrarily control the reproducible number of video tape, enhancing security level. In addition, the present invention provides pay per play in which fare varies with the reproducible number according to the reproducible number limiting algorithm. Furthermore, the present invention is applied along with digital or analog copy protection method, realizing perfect copyright protection against a program given in the form of broadcast signal.

What is claimed is:

1. A reproducible number limiting apparatus for a magnetic recording medium using a reproducible number limiting algorithm comprising:

scrambling means for scrambling an input bit stream using a scrambling key;

encryption means for encrypting said scrambling key used in said scrambling means' scrambling and additional information, and outputting a ciphertext;

decryption means for updating said additional information for every playback from the ciphertext using an encryption key, and destroying said scrambling key when said additional information satisfies a specific condition; and descrambling means for descrambling a reproduced bit stream using said scrambling key from said decryption means;

wherein said encryption means comprises:

a key storage for storing an encryption key required in encryption;

an error correction code encoder for receiving data of predetermined bits and performing error-correcting encoding;

an adder for EXCLUSIVE-OR operating the output of said error correction code encoder and the additional information; and a matrix multiplier for multiplying the output of said adder by a nonsingular matrix from said key storage, and outputting a ciphertext.

2. A reproducible number limiting apparatus for a magnetic recording medium using a reproducible number limiting algorithm as claimed in claim 1, wherein said additional information is a reproducible number.

3. A reproducible number limiting apparatus for a magnetic recording medium using a reproducible number limiting algorithm as claimed in claim 1, further comprising recording/reproducing means for recording or reproducing the output of said scrambling means and encryption means.

4. A reproducible number limiting apparatus for a magnetic recording medium using a reproducible number limiting algorithm as claimed in claim 3, wherein said recording means comprises:

a data region recording portion for recording the output of said scrambling means on the data region of a magnetic recording medium; and a dummy region recording portion for recording the output of said encryption means on the magnetic recording medium.

5. A reproducible number limiting apparatus for a magnetic recording medium using a reproducible number limiting algorithm as claimed in claim 4, further comprising a dummy region recording/reproducing controller for controlling the operation of said dummy region recording portion and dummy region reproducing portion according to the reproducible number information output from said decryption means, to thereby update the reproducible number.

6. A reproducible number limiting apparatus for a magnetic recording medium using a reproducible number limiting algorithm as claimed in claim 3, wherein said reproducing means comprises:

a data region reproducing portion for reproducing data record on the data region of said magnetic recording medium; and a dummy region reproducing portion for reproducing the ciphertext recorded on the magnetic recording medium by said dummy region recording portion.

7. A reproducible number limiting apparatus for a magnetic recording medium using a reproducible number limiting algorithm as claimed in claim 6, further comprising a dummy region recording/reproducing controller for controlling the operation of said dummy region recording portion and dummy region reproducing portion according to the reproducible number information output from said decryption means, to thereby update the reproducible number.

8. A reproducible number limiting apparatus for a magnetic recording medium using a reproducible number limiting algorithm as claimed in claim 3, wherein said dummy region reproducing portion comprises a repetition code error correcting portion for performing error correction to prevent the SNR decrease of the output of said encryption means using a repetition code.

9. A reproducible number limiting apparatus for a magnetic recording medium using a reproducible number limiting algorithm comprising:

scrambling means for scrambling an input bit stream using a scrambling key;

encryption means for encrypting said scrambling key used in said scrambling means' scrambling and additional information, and outputting a ciphertext;

decryption means for updating said additional information for every playback from the ciphertext using an encryption key, and destroying said scrambling key when said additional information satisfies a specific condition;

descrambling means for descrambling a reproduced bit stream using said scrambling key from said decryption means; wherein said decryption means compromises:

a matrix multiplier for obtaining a signal of predetermined bits from the ciphertext;

an error correction code encoder for receiving the output of said matrix multiplier and performing error-correction decoding; and an additional information updating portion for updating the additional information of the ciphertext from the output of said error correction code decoder.

10. A reproducible number limiting apparatus for a magnetic recording medium using a reproducible number limiting algorithm as claimed in claim 9, wherein said additional information is a reproducible number.

11. A reproducible number limiting apparatus for a magnetic recording medium using a reproducible number limiting algorithm as claimed in claim 9, further comprising a recording/reproducing means for recording or reproducing the output of said scrambling means and encryption means.

12. A reproducible number limiting apparatus for a magnetic recording medium using a reproducible number limiting algorithm as claimed in claim 11, wherein said recording means comprises:

a data region recording portion for recording the output of said scrambling means on the data region of a magnetic recording medium; and a dummy region recording portion for recording the output of said encryption means on the magnetic recording medium.

13. A reproducible number limiting apparatus for a magnetic recording medium using a reproducible number limiting algorithm as claimed in claim 12, further comprising a dummy region recording/reproducing controller for controlling the operation of said dummy region recording portion and dummy region reproducing portion according to the reproducible number information output from said decryption means, to thereby update the reproducible number.

14. A reproducible number limiting apparatus for a magnetic recording medium using a reproducible number limiting algorithm as claimed in claim 11, wherein said reproducing means comprises:

a data region reproducing portion for reproducing data record on the data region of said magnetic recording medium; and a dummy region reproducing portion for reproducing the ciphertext recorded on the magnetic recording medium by said dummy region recording portion.

15. A reproducible number limiting apparatus for a magnetic recording medium using a reproducible number limiting algorithm as claimed in claim 14, further comprising a dummy region recording/reproducing controller for controlling the operation of said dummy region recording portion and dummy region reproducing portion according to the reproducible number information output from said decryption means, to thereby update the reproducible number.

16. A reproducible number limiting apparatus for a magnetic recording medium using a reproducible number limiting algorithm as claimed in claim 11, wherein said dummy region reproducing portion comprises a repetition code error correcting portion for performing error correction to prevent the SNR decrease of the output of said encryption means using a repetition code.

17. A reproducible number limiting apparatus for a magnetic recording medium using a reproducible number limiting algorithm comprising:

scrambling means for scrambling an input bit stream using a scrambling key;

encryption means for encrypting said scrambling key used in said scrambling means' scrambling and additional information, and outputting a ciphertext;

decryption means for updating said additional information for every playback from the ciphertext using an encryption key, and destroying said scrambling key when said additional information satisfies a specific condition;

descrambling means for descrambling a reproduced bit stream using said scrambling key from said decryption means;

recording/reproducing means for recording or reproducing the output of said scrambling means and encryption means;

a dummy region recording portion for recording the output of said encryption means on the magnetic recording medium; and a dummy region reproducing portion for reproducing the ciphertext recorded on the magnetic recoding medium by said dummy region reproducing portion;

wherein said dummy region reproducing portion comprises a repetition code error correcting portion for performing error correction to prevent the SNR decrease of the output of said encryption means using a repetition code.

18. A reproducible number limiting apparatus for a magnetic recording medium using a reproducible number limiting algorithm as claimed in claim 17, wherein said additional information is a reproducible number.

19. A reproducible number limiting apparatus for a magnetic recording medium using a reproducible number limiting algorithm as claimed in claim 17, further comprising a dummy region recording/reproducing controller for controlling the operation of said dummy region recording portion and dummy region reproducing portion according to the reproducible number information output from said decryption means, to thereby update the reproducible number.

* * * * *

UNITED STATES PATENT AND TRADEMARK OFFICE
CERTIFICATE OF CORRECTION

PATENT NO. : 5,796,826
DATED : August 18, 1998
INVENTOR(S) : Tae Joon Park

Figure 10A:
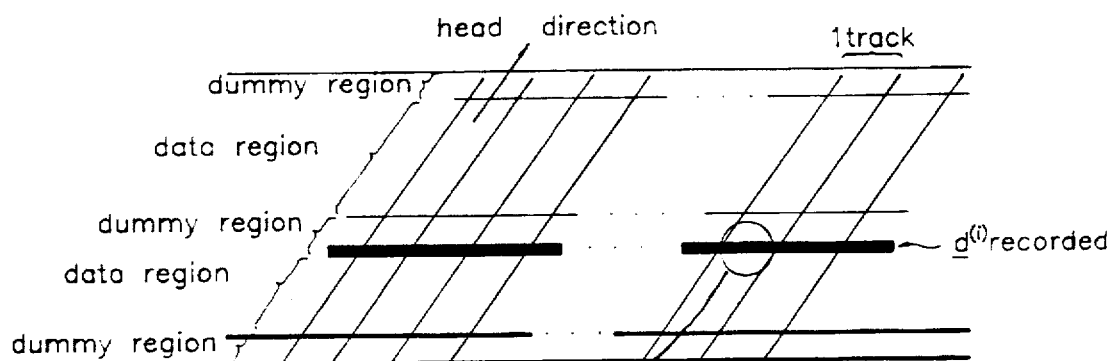
FIG. 10 shows a recording format of video tape according to the present invention.
Figure 10B:
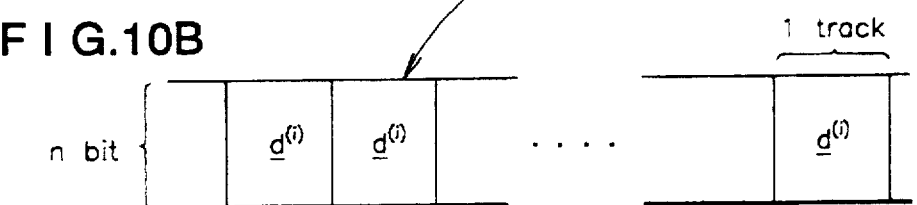

It is certified that error appears in the above-identified patent and that said Letters Patent is hereby corrected as shown below:

Column 2, line 31, replace "Fig. 10 shows" with --Figs. 10A-10B show --.

Column 7, lines 26 and 38, replace "Fig 10" with --Figs. 10A-10B-- .

Signed and Sealed this

Sixteenth Day of February, 1999

Attest:

Attesting Officer

*Acting Commissioner of Patents and Trademarks*